United States Patent [19]

Yokoi et al.

[11] Patent Number: 4,795,686
[45] Date of Patent: Jan. 3, 1989

[54] SODIUM-SULFUR ELECTRIC CELL AND PROCESS FOR MANUFACTURING THE SAME

[75] Inventors: Kazuaki Yokoi; Toshihiro Yamada; Hiroyuki Kawamoto, all of Ibaraki, Japan

[73] Assignee: Hitachi, Ltd., Tokyo, Japan

[21] Appl. No.: 88,222

[22] Filed: Aug. 24, 1987

[30] Foreign Application Priority Data

Aug. 29, 1986 [JP] Japan .................................. 61-201462

[51] Int. Cl.⁴ ..................... H01M 10/38; H01M 10/39
[52] U.S. Cl. ..................................... 429/104; 29/623.2
[58] Field of Search ................ 429/104; 29/623.2; 228/193

[56] References Cited

U.S. PATENT DOCUMENTS

| | | | |
|---|---|---|---|
| 3,959,013 | 5/1976 | Breiter | 429/104 |
| 4,037,027 | 7/1977 | Desplanches et al. | 429/104 |
| 4,236,661 | 12/1980 | Dunn et al. | 228/193 |
| 4,248,943 | 2/1981 | Ludwig et al. | 429/104 |

Primary Examiner—Donald L. Walton
Attorney, Agent, or Firm—Antonelli, Terry & Wands

[57] ABSTRACT

The present invention relates to a sodium-sulfur electric cell structure having a specific joint between a cathode tube and an anode tube. The cathode and anode tubes are each made of an iron-nickel base alloy and are joined to each other through the medium of a ceramic ring and an aluminum alloy insert provided on both sides of the ceramic ring. A chromium or chromium-rich layer is formed at the joint boundary between the insert and each tube. The sodium-sulfur electric cell having such a structure eliminates a problem of the occurrence of cracking, improves the airtightness and enables the production of large-sized electric cells.

7 Claims, 1 Drawing Sheet

SODIUM-SULFUR ELECTRIC CELL AND PROCESS FOR MANUFACTURING THE SAME

BACKGROUND OF THE INVENTION

1. Field of the Invention

This invention relates to a sodium-sulfur electric cell and a process for manufacturing the same. More particularly, the present invention is concerned with a sodium-sulfur electric cell having excellent strength and airtightness and a process for manufacturing the same.

2. Description of the Prior Art

In conventional processes for manufacturing a sodium-sulfur electric cell as described in U.S. Pat. No. 4,037,027, attention was mainly directed to the corrosion resistance of anode and cathode tubes, and a stainless steel material was used for the anode and cathode tubes. However, no study was made on the adoption of materials having a low coefficient of thermal expansion for the purpose of attaining a high strength, not to mention a method of joining these materials with each other to attain excellent airtightness.

Specifically, although the above-mentioned prior art method uses a stainless steel as the cathode and anode tubes mainly taking into consideration the corrosion resistance to sodium, sulfur and sodium polysulfide, no attention was directed to an improvement in the strength of the joints or to the airtightness of the joints. Therefore, the prior art method was accompanied by problems such as low joint strength and insufficient airtightness.

The sodium-sulfur electric cell made of stainless steel according to the prior art method is primarily intended for the adaptation to small-sized products (e.g., electric cells having a capacity of 80 W/hr and an outer diameter of 30 mm$\phi$). When this method is applied to large-sized products (e.g., electric cells having a capacity of 600 W/hr or more and an outer diameter of 75 mm$\phi$), an anode tube made of stainless steel is joined to a cathode tube made of stainless steel through the medium of an aluminum insert. However, this causes a problem that the larger the outer diameter, the lower the joint strength of the joints. It is noted in this connection that the aluminum insert is used solely because of excellent corrosion resistance thereof to sodium and sulfur.

SUMMARY OF THE INVENTION

An object of the present invention is to provide a sodium-sulfur electric cell of which the joints are excellent in strength and airtightness and a process for manufacturing the same.

The above-mentioned objects can be attained by providing cathode and anode tubes each made of a material having a low coefficient of thermal expansion comprised of an iron(Fe)-nickel(Ni) base alloy such as iron(Fe)-nickel(Ni) alloy, iron (Fe)-nickel(Ni)-cobalt(Co) alloy, iron(Fe)-nickel(Ni)-chromium(Cr) alloy, and iron(Fe)-nickel(Ni)-titanium(Ti) alloy, providing a chromium layer or a layer composed mainly of chromium, and then joining the cathode to the anode tubes with an aluminum insert.

Specifically, in one aspect of the present invention there is provided a sodium-sulfur electric cell comprising an anode tube closed at its one end; a cathode tube closed at its one end, the open end of the anode tube being joined to the open end of the cathode tube with the medium of an aluminum or aluminum alloy insert and a ring insulating member; a solid electrolyte tube extending towards the cathode tube, the open end of the solid electrolyte tube being joined to the inside of the ring insulating member; sulfur contained in a compartment defined by the cathode tube and the solid electrolyte tube; an anode and sodium each contained in a compartment defined by an anode tube and solid electrolyte tube; and conductive materials respectively connected to said anode tube and said cathode, wherein said anode tube and the cathode tube are each made of an iron-nickel base alloy, with a chromium layer or a chromium-rich layer provided at the boundary between each iron-nickel base alloy and the insert, and the insulating member is a ceramic ring. Sodium and sulfur are both liquid at operation temperature (e.g., at 350° C.).

Further, in another aspect of the present invention, there is provided a process for manufacturing a sodium-sulfur cell comprising disposing cathode and anode tubes respectively on an electrical insulating ring at its sides other than the side joined to an open end of a sodium ion conductive solid electrolyte tube, and pressing, while heating, the cathode and anode tubes against the ring through the medium of an insert interposed between the ring and each of the cathode and anode tubes, wherein the cathode and anode tubes are each made of an iron-nickel base alloy, the cathode and anode tubes each have on their joining surface a chromium or chromium-rich layer, and the joining to the insulating ring is connected with the aluminum or aluminum alloy insert through the medium of the chromium or chromium-rich layer.

It is preferred that the chromium or chromium-rich layer be formed by chromizing the joining surface of each of the cathode and anode tubes.

Further, it is preferred that the iron-nickel base alloy be a member selected from the group consisting of iron-nickel alloy, iron-nickel-cobalt alloy, iron-nickel-chromium alloy, and iron-nickel-titanium alloy.

The ceramic ring is preferably a member selected from the group consisting of rings of alumina, zirconia, sialon, silicon nitride and silicon carbide.

In the present invention, a material having a low coefficient of thermal expansion is used as a material of the cathode and anode tubes to be joining to a ceramic ring with an aluminum insert, and a chromium layer or a layer composed mainly of chromium is provided on the material having a low coefficient of thermal expansion through the chromizing treatment, plating or the like. The joint between the chromium layer or layer composed mainly of chromium and the ceramic ring through the medium with the aluminum insert brings about the modification of the layer formed by reaction and present at the boundary between the material having a low coefficient of thermal expansion and the aluminum insert, which enables the realization of a sodium-sulfur electric cell having excellent strength and airtightness.

The use of the above-mentioned material having a low coefficient of thermal expansion for the cathode and anode tubes improves the strength of the joint boundary. However, when the material having a low coefficient of thermal expansion is directly joined to the aluminum insert, fine cracks tend to occur at the joint boundary formed of an intermetallic compound between the metals constituting the members. The application of the chromium layer or chromium-rich layer to the joint boundary prevents the occurrence of cracks and brings about an improvement in the airtightness. It is noted in this connection that chromium is resistant to sodium and sulfur. In the present invention, it is preferred that the difference in the coefficient of thermal expansion between the ceramic ring and the anode and cathode tubes be as small as possible. Further, it is preferred that the difference in the coefficient of thermal expansion between the solid electrolyte tube and the ceramic ring be also as small as possible.

According to the present invention, a sodium-sulfur electric cell can be obtained by using a material having a low coefficient of thermal expansion, such as iron-nickel alloy or iron-nickel-cobalt alloy, as the material of the cathode and anode tubes of the sodium-sulfur electric cell, providing a chromium layer or a layer composed mainly of chromium on the material having a low coefficient of thermal expansion, and joining each of the cathode and anode tubes to an electrical insulating ceramic ring through an aluminum insert.

PREFERRED EMBODIMENTS OF THE INVENTION

The present invention will now be described in more detail by way of examples with reference to the accompanying drawings.

EXAMPLE 1

(joint between cathode and anode tubes each made of an Fe—42% Ni alloy)

Figure 1:
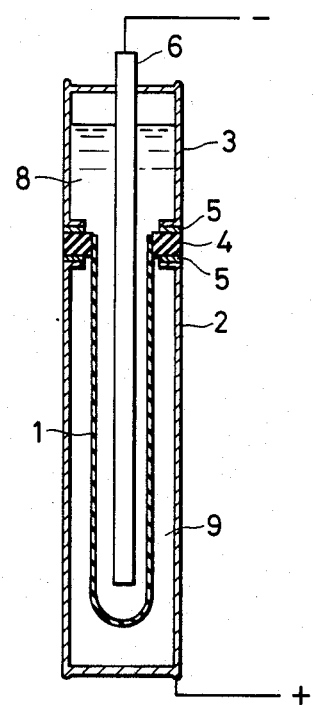
FIG. 1 is a cross-sectional view of one form of the sodium-sulfur electric cell according to the present invention.

FIG. 1 is a cross-sectional view of a sodium-sulfur electric cell. A solid electrolyte tube 1 is surrounded by a cathode tube 2, and an anode tube 3 is disposed above the cathode tube. An alumina ring 4 is soldered with glass to the open end of the solid electrolyte tube 1 (made of $\beta''$—Al$_2$O$_3$ in the case of this example) for electrical insulation. The anode tube 3 and the cathode tube 2 are respectively joined to the alumina ring 4 at the upper end lower sides other than the above-mentioned joining surface of the alumina ring 4 with an insert 5 made of aluminum so that the alumina ring is interposed between the aluminum insert and the cathode and anode tubes. Numeral 6 designates an anode, numeral 8 sodium (Na), and numeral 9 sulfur (S). The joint between the anode tube 3 and the anode tube 2 will now be described by way of a mimic test piece.

Figure 3:
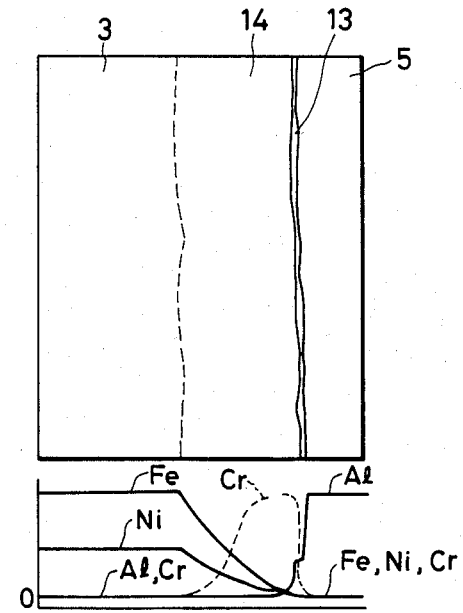
FIG. 3 is a typical cross-sectional view and a concentration distribution pattern of the joint formed by joining an aluminum insert to an iron-nickel base alloy material having a joining surface which has been subjected to a chromizing treatment.

An alumina ring 4 is interposed between an anode tube 3 and a cathode tube 2 each made of an iron(Fe)—42% nickel(Ni) alloy (coefficient of thermal expansion: 67 to 78 (at 30° to 450° C.)×10$^{-7}$/°C.) and subjected to a chromizing treatment and between an anode tube 3 and a cathode tube 2 each made of an Fe—42%Ni alloy but not subjected to any treatment, thereby preparing two kinds of samples. In FIG. 3, numeral 14 designates a chromium-rich layer formed by diffusing chromium into an Fe—Ni alloy layer through a chromizing treatment.

An insert 5 made of aluminum is further interposed between the alumina ring 4 and the anode tube 3 and between the alumina ring 4 and the cathode tube 2. It is noted in this connection that the aluminum insert 5 has a three-layer structure comprised of a core material made of an aluminum alloy and two skin materials each made of an aluminum (Al)—10% silicon (Si)—2% magnesium(Mg) alloy. The two kinds of test pieces were each heated and maintained in a pressed state under the following conditions to allow it to join: a vacuum of 10$^{-4}$ Torr; a joining temperature of 600° C.; and a jointing pressure of 0.5 kgf/mm$^2$. The test pieces thus joined were each examined for airtightness with a helium (He) leakage detector. As a result, the leakage of helium was observed on the test piece which had been joined with the non-treated Fe—42% Ni alloy although the test a piece could be drawin to a vacuum of about 10$^{-5}$ Torr, while leakage of helium was not observed at all on the test piece which had been joined with the chromized Fe—42% Ni alloy.

It is noted that under the above-mentioned conditions, a part of the Al—10%Si—2%Mg layer 5 constituting the skin layer of the Al insert reacts with the material to be joined, and the remainder escapes from the joined surface.

Figure 2:
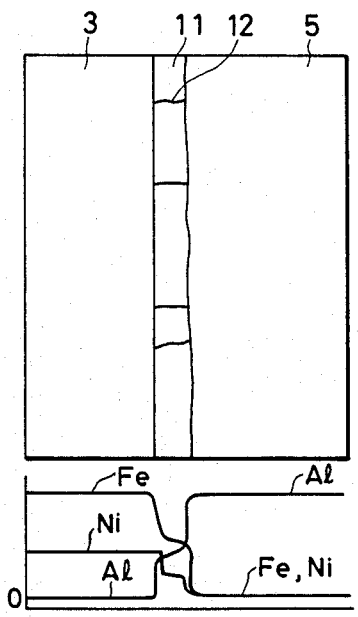
FIG. 2 is a typical cross-sectional view and a concentration distribution pattern of the joint between an iron-nickel base alloy material free from a chromium layer or a chromium-rich layer on the joining surface thereof, and an insert made of aluminum.

FIGS. 2 and 3 are each a typical view of a microstructure and a concentration distribution pattern of individual constituent elements with respect to the joint between an Fe—42% Ni alloy 3 and an aluminum insert 5 (magnification: ×400). As shown in FIG. 2, an intermetallic compound layer 11 comprised of iron, nickel and aluminum is formed at the joint boundary of the non-treated Fe—42% Ni alloy, and fine cracks 12 are formed in the compound layer. The cracks are arranged in the form of a turtle shell in that layer, which allows a passage of the helium gas, thus leading to its leakage. On the other hand, as shown in FIG. 3, although a remarkably thin intermetallic compound layer 13 is formed at the joint boundary of the chromized Fe—42% Ni alloy, the compound layer is composed of aluminum and chromium and is not only substantially free from iron and nickel, but also quite free from fine cracks which would allow a passage of the helium gas. Numeral 14 designates a chromium diffusing layer.

Then, the tensile strength of the test pieces each comprising the aluminum insert having the same thickness, i.e., 2.5 cm, was determined. As a result, it was found that the tensile strength of the test piece in which a chromized Fe—42% Ni alloy was used was 1.5 to 2 times that of the test piece in which an Fe—18%-Cr—8%Ni austenitic stainless steel which had been used as the material of the anode and cathode tubes. It is noted in this connection that the chromizing treatment can impart excellent sodium and sulfur resistance to the material. Therefore, it is extremely effective to use an Fe—42% Ni alloy which has been subjected to chromizing treatment for a sodium-sulfur electric cell.

EXAMPLE 2

(joint between cathode and anode tubes each made of an Fe—Ni—Co alloy)

An Fe—29%Ni—17%Co alloy and a zirconia ring were used as constituting members, and the jointing was conducted under the same conditions as in EXAMPLE 1. The test pieces thus obtained were applied to a helium leakage test. As a result, it was found that with respect to the non-treated Fe—29%Ni—17%Co alloy (coefficient of thermal expansion: 50 to 54 (at 30° to 450° C.)×10$^{-7}$/°C.) test piece, fine cracks were formed in an intermetallic compound layer comprised of iron, nickel, cobalt, and aluminum, thus allowing helium leakage. On the other hand, with respect to the chromized Fe—29%Ni—17%Co alloy test piece, the intermetallic compound layer was comprised of aluminum and chromium and was substantially free from iron, nickel, and cobalt. This intermetallic compound layer was free from not only the occurrence of fine cracks but also from helium leakage. Further, the tensile strength of the test pieces was determined in the same manner as in EXAMPLE 1. As a result, it was found that the tensile strength of the chromized Fe—29%Ni—17%Co alloy test piece was 1.7 times that of an 18-8 stainless steel.

Although the ceramic ring was an alumina ring in the above EXAMPLE 1 and a zirconia ring in EXAMPLE 2, the same effects can be attained by other rings such as those of sialon, silicon nitride and silicon carbide. Further, the same effects can be attained when the cathode and anode tubes are made of an Fe—Ni—Cr or Fe—Ni—Ti alloy.

It is noted in this connection that the coefficients of thermal expansion of an Fe—42%Ni—6%Cr alloy, an Fe—47%Ni—5%Cr alloy, and an Fe—16%Cr—1%Ti alloy are 97 to 104 (at 30° to 425° C.)×10$^{-7}$/°C., 94 to 102 (at 30° to 380° C.)×10$^{-7}$/°C., and 109 to 115 (at 30° to 400° C.)×10$^{-7}$/°C., respectively.

Although the chromium layer was formed by the chromizing treatment in the above examples, it may be formed also through chemical or electrical chromium plating.

In EXAMPLES 1 and 2, the joining was conducted in vacuum. Alternatively, the joining may be conducted in an inert gas atmosphere or in the air, as well.

What is claimed is:

1. A sodium-sulfur electric cell comprising an anode tube closed at one end; a cathode tube closed at one end, an open end of said anode tube being joined to an open end of said cathode tube with a medium of an aluminum alloy insert and a ring insulating member; a solid electrolyte tube extending towards said cathode tube, an open end of said solid electrolyte tube being joined to an inside of said ring insulating member; sulfur contained in a compartment defined by said cathode tube and said solid electrolyte tube; an anode and sodium each contained in a compartment defined by said anode tube and said solid electrolyte tube; and conductive materials respectively connected to said cathode tube and said anode, wherein said anode tube and said cathode tube are each made of an iron-nickel base alloy, wherein a chromium layer or a chromium-rich layer is provided at a boundary between said each iron-nickel base alloy and said insert, wherein said insulating member is a ceramic ring, and wherein said aluminum alloy insert is a three-layered structure having a core layer of an aluminum alloy and two outer layers each made of an aluminum-silicaon-magnesium alloy.

2. A sodium-sulfur electric cell according to claim 1, wherein said iron-nickel base alloy is a member selected from the group consisting of an iron-nickel alloy, an iron-nickel-cobalt alloy, an iron-nickel-chromium alloy, and an iron-nickel-titanium alloy.

3. A sodium-sulfur electric cell according to claim 1, wherein said ceramic ring is a member selected from the group consisting of an alumina ring, a zirconia ring, a sialon ring, a silicon nitride ring, and a silicon carbide ring.

4. A sodium-sulfur electric cell according to claim 1, wherein the outer layers are each made of an aluminum-10% silicon-2% magnesium alloy.

5. A sodium-sulfur electric cell according to claim 1, wherein said chromium or chromium-rich layer is formed by a chromizing treatment of said anode and cathode tubes.

6. A process for manufacturing a sodium-sulfur cell comprising disposing cathode and anode tubes on an electrical insulating ring at an area other than a side of said ring which is joined to an open end of a sodium ion conductive solid electrolyte tube, and pressing, while heating, said cathode and anode tubes against said ring through the medium of an aluminum alloy insert interposed between said ring and each of said cathode and anode tubes to join said cathode and anode tubes to said ring, wherein said cathode and anode tubes are each made of an iron-nickel base alloy, wherein said cathode and anode tubes each have on a joining surface a chromium or chromium-rich layer, and wherein the joining to said insulating ring is conducted with said aluminum alloy insert through the medium of said chromium or chromium rich layer; said aluminum alloy insert being a three-layered structure having a core layer of an aluminum alloy and two outer layers each made of an aluminum-silicon-magnesium alloy.

7. A process according to claim 6, wherein said chromium or chromium-rich layer is formed by a chromizing treatment of said cathode and anode tubes on their joining surfaces.

* * * * *